(12) United States Patent
Brand

(10) Patent No.: US 8,290,297 B2
(45) Date of Patent: *Oct. 16, 2012

(54) METHOD FOR EDITING IMAGES AND VIDEOS

(75) Inventor: Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 927 days.

This patent is subject to a terminal disclaimer.

(21) Appl. No.: 12/356,398

(22) Filed: Jan. 20, 2009

(65) Prior Publication Data

US 2010/0183242 A1    Jul. 22, 2010

(51) Int. Cl.
*G06K 9/36* (2006.01)
*G06K 9/03* (2006.01)

(52) U.S. Cl. ........................ 382/282; 382/309

(58) Field of Classification Search ............... 382/173, 382/275, 282, 276, 284, 305, 309; 714/792; 375/240; 345/41
See application file for complete search history.

(56) References Cited

U.S. PATENT DOCUMENTS

| | | | | |
|---|---|---|---|---|
| 5,778,192 A * | 7/1998 | Schuster et al. | ............... | 709/247 |
| 6,460,153 B1 * | 10/2002 | Chou et al. | .................... | 714/746 |
| 6,470,469 B1 * | 10/2002 | Chou et al. | .................... | 714/746 |
| 6,909,746 B2 * | 6/2005 | Trovato | .................... | 375/240.03 |
| 6,996,129 B2 * | 2/2006 | Krause et al. | ................. | 370/487 |
| 7,477,800 B2 | 1/2009 | Avidan et al. | | |
| 7,561,078 B2 * | 7/2009 | Hwang et al. | .................. | 341/79 |

FOREIGN PATENT DOCUMENTS

WO    2009-070449    6/2009

OTHER PUBLICATIONS

Efros et al., "Image quilting for texture synthesis and transfer," Proc. SIGGRAPH, 2001.
Kwatra et al., "Image and video synthesis using graph cuts," Proc. SIGGRAPH, 2003.
Wolf et al., "Non-homogeneous content-driven video-retargeting," Proc. ICCV, 2007.
Tutte, "How to draw a graph," Proc. London Mathematical Society, 13(1):743-767, 1963.
Setlur et al., "Automatic image retargeting," Proc. Mobile and Ubiquitous Multimedia, 2005.
Simakov et al., "Summarizing visual data using bidirectional similarity," Proc. CVPR, 2008.
Cho et al., "The patch transform and its applications to image editing," CVPR, 2008.

* cited by examiner

*Primary Examiner* — Kanjibhai Patel
(74) *Attorney, Agent, or Firm* — Dirk Brinkman; Gene Vinokur

(57) ABSTRACT

A method edits editing an input image to produce an output image by first partitioning pixels of the input image into sets of adjacent pixels. Then, for each set, a trellis of nodes connected by directed links is defined. Each node corresponds to one of the pixels in the set of pixels, and an action and location of the pixel in the output image. Costs are assigned to the nodes and the links. A least cost path through the trellis is determined, and pixels corresponding to the nodes on the least cost path are edited according to the action and location to form the output image.

24 Claims, 12 Drawing Sheets

METHOD FOR EDITING IMAGES AND VIDEOS

FIELD OF THE INVENTION

This invention relates generally to image processing, and more particularly to editing images to different size, shape, and content.

BACKGROUND OF THE INVENTION

The diversity and versatility of print and display devices imposes demands on designers of multimedia content for rendering and viewing. For instance, designers must provide different alternatives for web-content, and design different layouts for different rendering applications and devices, ranging from tiny "thumbprints" of images often seen in selections menus, small, low resolution mobile telephone screens, slightly larger PDA screens, to large, high resolution elongated flat panel displays, and projector screens. Adapting images to different rendering applications and devices than originally intended is called image retargeting.

Conventional image editing by retargeting typically involves scaling and cropping. Image scaling is insufficient because it ignores the image content and typically can only be applied uniformly. Scaling also does not work well when the aspect ratio of the image needs to change, because it introduces visual distortions. Cropping is limited because it can only remove pixels from the image periphery. More effective resizing can only be achieved by considering the image content as a whole, in conjunction with geometric constraints of the output device.

While resizing an image, there is a desire to change the size of the image while maintaining important features in the content of the image. This can be done with top-down or bottom-up methods. Top-down methods use tools such as face detectors to detect important regions in the image, whereas bottom-up methods rely on visual saliency methods to construct visual saliency map of the source image. After the saliency map is constructed, cropping can be used to display the most important region of the image, see U.S. Pat. No. 7,477,800 Avidan et al., and PCT/U.S. Patent Application PCT/U.S.08/83252—Rubenstein et al.

Other editing methods can be based on image contours. Discrete programming can be used to detect the contours in images, Montanari, "On the optimal detection of curves in noisy pictures," Communications of the ACM, 14(5):335-345, 1971. The Use of Such Contours for Image Edits Originates with Intelligent Scissors, Mortensen et al., "Intelligent Scissors," Proc SIGGRAPH, 1995, and for composing new pixel adjacencies in texture synthesis, Afros et al., "Image Quilting for Texture Synthesis and Transfer," Proc. SIGGRAPH, 2001, and Kwatra et al., "Image and Video Synthesis Using Graph Cuts," Proc. SIGGRAPH, 2003. The Efros et al. and Kwatra et al. use contours where the image has minimal contrast; these are called seams.

Avidan et al., see above, describe carving away pixels along a low contrast image-spanning seam to narrow an image by one column or row. Doing so repeatedly yields a very striking animation. There is no penalty for distortions, but if no seam transects foreground scene objects, these are left intact. The method is very simple and fast. However, seam carving often distorts and damages image contours. The seams are not optimal for the target image dimensions, and a greedy sequential strategy precludes the use for videos. Rubenstein et al., use a graph-cut reformulation that handles video, but the optimizer is impractically slow and still limited to greedy seam removal.

Another method describes linear or quadratic penalties for squeezing pixels together Wolf et al., "Non-Homogeneous content-driven video-retargeting," Pro ICCV, 2007. The quadratic version is solved by the same sparse least-squares computation that gives weighted Tutte embeddings of graphs in the plane, see Tutte, "How to draw a graph," Proc. London Mathematical Society, 13(1):743-767, 1963. However, that method is vulnerable to unwanted embedding "catastrophes" where regions of the image invert and overlap over other regions, i.e., the pixel order is not necessarily preserved.

Image editing can also be performed partitioning and an image into segments, and recompositing the segments in visually pleasing ways, Setlur et al., Automatic image retargeting," Proc. Mobile and Ubiquitous Multimedia, 2005, Simakov et al., Summarizing visual data using bidirectional similarity," Proc. CVPR, and Cho et al., "The Patch Transform and its Applications to Image Editing," CVPR, 2008.

Other image editing functions include removing and adding objects to images or videos.

SUMMARY OF THE INVENTION

This invention provides a method for editing images and video by actions such as moving, deleting, inserting, and modifying pixels. The user specifies desired locations and/or values for some pixels in the output image, and the method finds edits for all other pixels that result in an output with minimal artifacts and distortions to the content of the image.

For example, the user may specify a new boundary shape for an image. In this case, the method imperceptibly rearranges pixels to widen and narrow the image where appropriate to attain that shape. If the user specifies that a set of pixels should be shifted to new locations within the image, the method deletes and fills in pixels around the moved pixels to make the change look natural. The method partitions the image into pixel sets, constructs a graph of possible edits on each set, finds a path through the graph that represents the least noticeable sequence of edits, and applies those edits to generate the output.

DETAILED DESCRIPTION OF THE PREFERRED EMBODIMENT

Figure 1A:
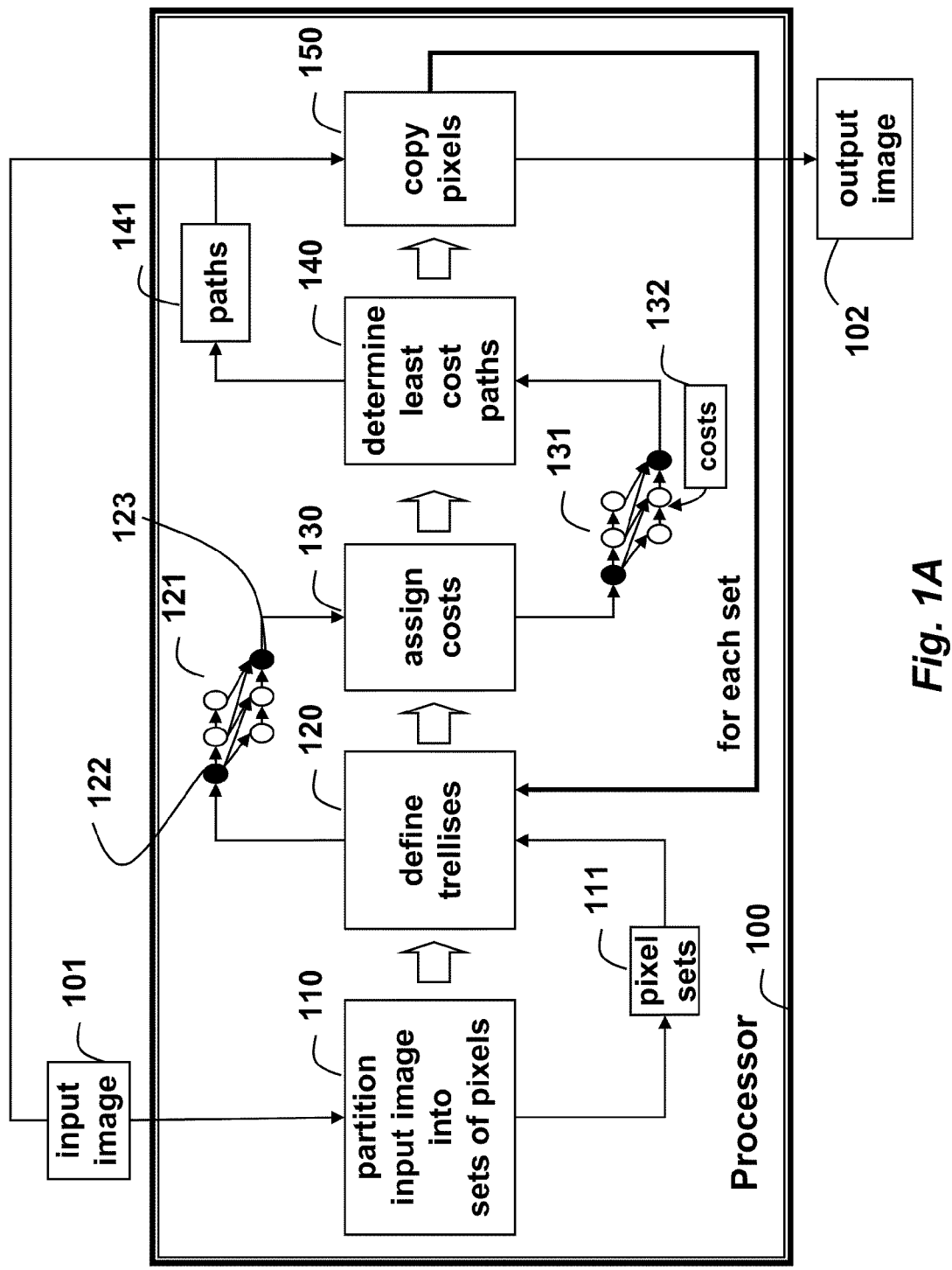
FIG. 1A is a flow diagram of a method for editing an input image to produce an output image according to embodiments of the invention.
Figure 1B:
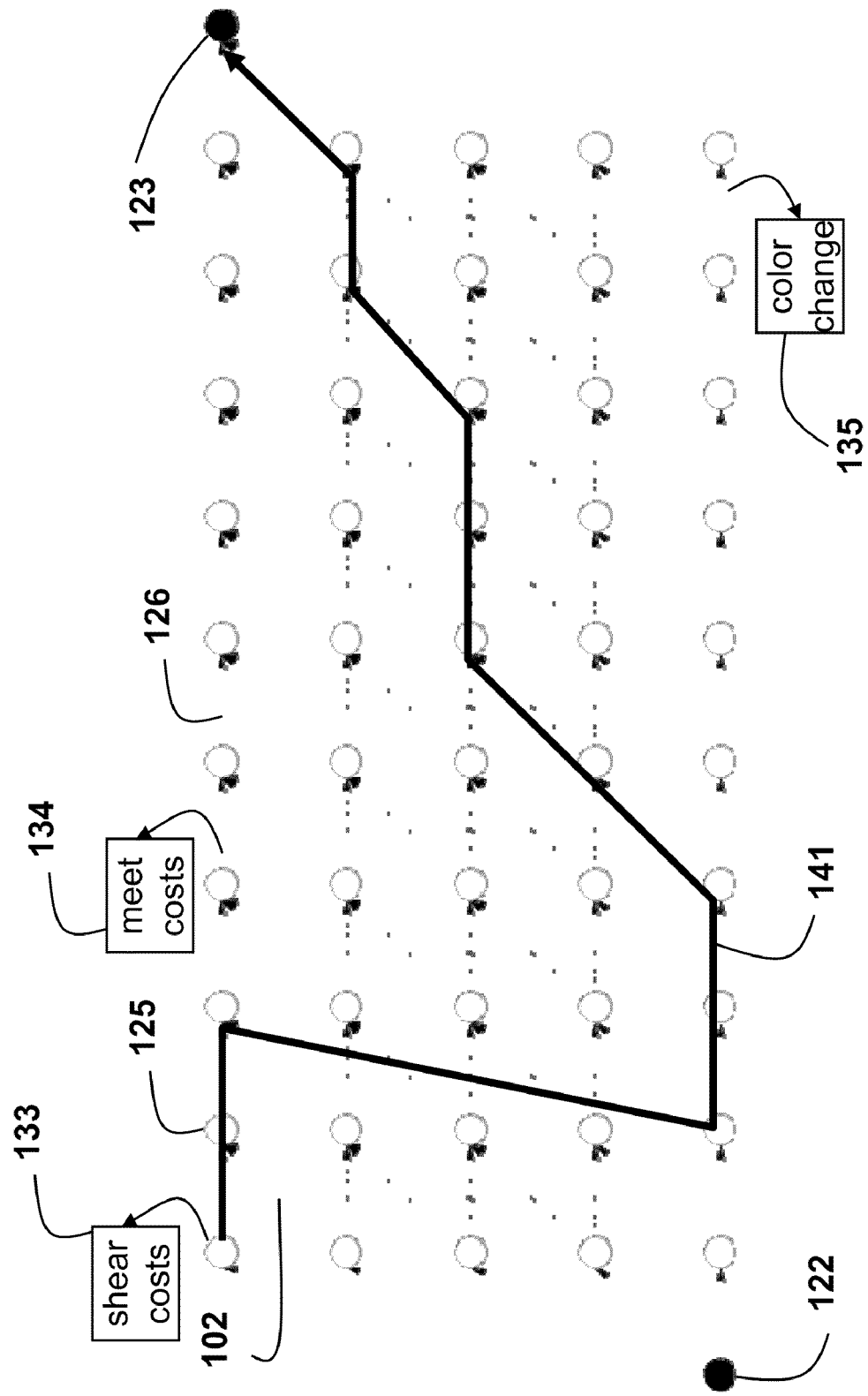
FIGS. 1B, 2 and 3 are trellises used by the method of FIG. 1A.

FIGS. 1A-1B shows a method for editing an input image 101 to produce an output image 102 according to embodiments of the invention. The method transforms the input image to a resized output image. The steps of the method are performed in a processor 100. The image editing uses dynamic programming (DP) trellises as shown in FIGS. 1B-7.

Image Darting

Editing the input image by darting is analogous to darting in sewing to alter a garment. In sewing, a small region of fabric is pinched together into a fold, and sewn closed, to form a dart, which locally alters a size and/or shape of the garment. The unnecessary fabric in the fold can be removed by cutting, to minimize a change in appearance of the garment. Similarly, darts can be inserted into the fabric to increase the size of the garment.

Likewise, image darting locally removes or adds a dart of pixels, and moves pixels adjacent to the dart together or apart so that a local size or shape of the image is altered, while a change in appearance of the output image is minimized, when compared with the input image.

If the method for darting is implemented as a quadratic program (QP), pixels can also be crowded together, effectively rescaling and "bending" parts of the image. The QP is constrained to output new coordinates for all pixels, such that the output image is some predetermined size and shape, without leaving gaps or changing a horizontal or vertical pixel ordering of the pixels. The objective of the QP is to minimize visible artifacts e.g., contrasts induced by newly adjacent pixels, and distortions when related pixels do not move together during the darting operation.

In the QP, auxiliary variables are defined to detect distortions such as shears, changes in slope between two pixels along an image contour, changes in curvature between three pixels along a contour, and perturbations of geometric ratios. These events are then subject to linear or quadratic penalties in the objective function. One advantage of darting, over other conventional image retargeting schemes, is that distortions are explicitly characterized and minimized.

One step during the construction of the QP makes the costs convex. As defined herein, a cost function c( ) is convex on some ordered set with a distance function if for any set members $x < y < z$, $$\text{distance}(x,z)c(y) \leq \text{distance}(y,z)c(x) + \text{distance}(x,y)c(z).$$

For example, although the shear cost of a periodic texture is itself periodic, the QP uses an upper bound on this cost, which is convex increasing in the size of the shear. This guarantees a single global optimum. Without convexification, the number of local optima can grow exponentially. Although the QP is sparse, the more image structure that is preserved, the more auxiliary variables are needed. This, and dependence on inherently continuous convex solvers, is time consuming.

If quadratic penalties are not needed, the QP can be simplified to a linear program (LP), which assesses an L1 norm on image distortions. In this embodiment, a full L1 norm darting objective (cost) function is minimized via dynamic programming (DP) along image scanlines, and certain pixel graphs. One embodiment of the method achieves a global optimum, another embodiment considers nonconvex costs. Another embodiment uses O(1) integer operations per pixel, regardless of the number of pixels removed, and is suitable for editing videos.

Darting

Darting is a way to edit an image so that a size of an images is altered, e.g., horizontally. In particular, an optimal set of pixel are removed from and/or inserted into each scanline of the image. The removed or inserted pixels form the dart. Henceforth, the focus is on removing pixels. A similar treatment for inserting pixels is described below.

Removing a pixel incurs two local costs, which reflect a perceptual impact of bringing previously unconnected pixels together.

The cost for bringing pixels within the scanline together, usually by removing intervening pixels, is the meet cost. In other words, the meet cost represents artifacts and distortions due to moving pixels within the current set together. The meet cost can also incorporate any texture cost associated with the removal, e.g., lost image energy.

The cost for moving pixels from different scanlines into contact is called the shear cost, because shearing the image changes a pixel's neighbors in adjoining scanlines. The shear cost represents artifacts and distortions due to moving a pixel into a new position relative to pixels in other sets of pixels. The shear cost can also incorporate any geometric cost associated with the removal, e.g., lost contour quality. The shear costs can be determined from the output locations, and values of previously processed pixels.

Typically, the meet costs are determined by the content of the scanline, and the shear costs are determined by the set of darts in adjacent scanlines. If these costs are known, a set of minimum-cost folds for the scanline of interest can be determined via dynamic programming (DP).

In the art, dynamic programming is a method of solving problems that have overlapping subproblems and optimal substructure that takes much less time than conventional methods. The word "programming" in "dynamic programming" has no particular connection to computer programming Instead, the term comes from the term "mathematical programming", a synonym for optimization. Thus, the "program" is the optimal plan for action that is produced. The optimal substructure, e.g., the trellis, means that optimal solutions of the subproblems can be used to find the optimal solutions of the overall problem. For example, a least cost path to a node in the trellis can be found by first computing a path to the node from all adjacent nodes, and then using this to select the least cost path.

General Editing Method

As shown in FIGS. 1A-1B, the pixels of the input image 101 are partitioned 110 into sets of pixels 111. Then, for each the following steps are performed.

The partitioning can be arbitrary, depending on user selected parameters, i.e., bandwidth and girth of a trellis 122 that is constructed 120 for each set. The trellis has nodes 125 connected by directed links 126. There is a start link 122 and an end link 123 at opposite corners of the trellis. Costs 132 are assigned 130 to the nodes and links.

Each node in the trellis represents one pixel in the set, and is associated with an action for the image editing, e.g. moving, deleting, inserting, and modifying, and a location for that pixel in the output image. The example trellis in FIG. 1B is for removing r=4 pixels from a scanline of p+r=14 pixels. Each column in the trellis corresponds to a column in the result. Upward diagonal links correspond to pixel removals. Each node has an associated shear cost 133. Each diagonal link 102 has an associated meet cost 134.

The links connected to the start and terminal node have color-change costs 135, because, perceptually, placing a new pixel at the beginning or end of a scanline is equivalent to changing the color of the original pixel. All nodes have unique costs but nodes on counter-diagonals, i.e., lines of slope −1, refer to the same pixel, in different locations, and thus have identical meet costs on their outgoing links.

Generally, the DP trellis has the following form. The nodes are arranged on a grid. The node in column i, row j represents an event that the pixel from column i+j−1 in the input image is copied to column i in the output image.

A path 141 through this node incurs the shear costs of that event. Node i, j is linked to all nodes i+1, k with k>j. If k>j, the path through this link incurs the meet cost of bringing pixel i+j−1 into adjacency with pixel i+k by removing k−j pixels.

All nodes in the first column are connected to the start node 132, with link costs representing how perceptible it is to replace the first pixel with the $j^{th}$ pixel. Similarly, all nodes in the last column are connected to a terminal node 133 with costs for changing the pixel in the last column.

The DP on the trellis determines 140 a least cost path 141. Then, the pixels from the input image are copied 150 to the output image at the locations specified by the nodes on the least cost path.

Optimality and Convexity

The method uses min-plus dynamic programming to locate the least cost path through the trellis. In min-plus algebra, the arithmetic addition of the conventional algebra is replaced by the point-wise minimization, and the arithmetic multiplication is replaced by the point-wise addition. The performance of the min-plus DP is linear in the number of pixels, and quadratic in the number of removals.

Figure 2:
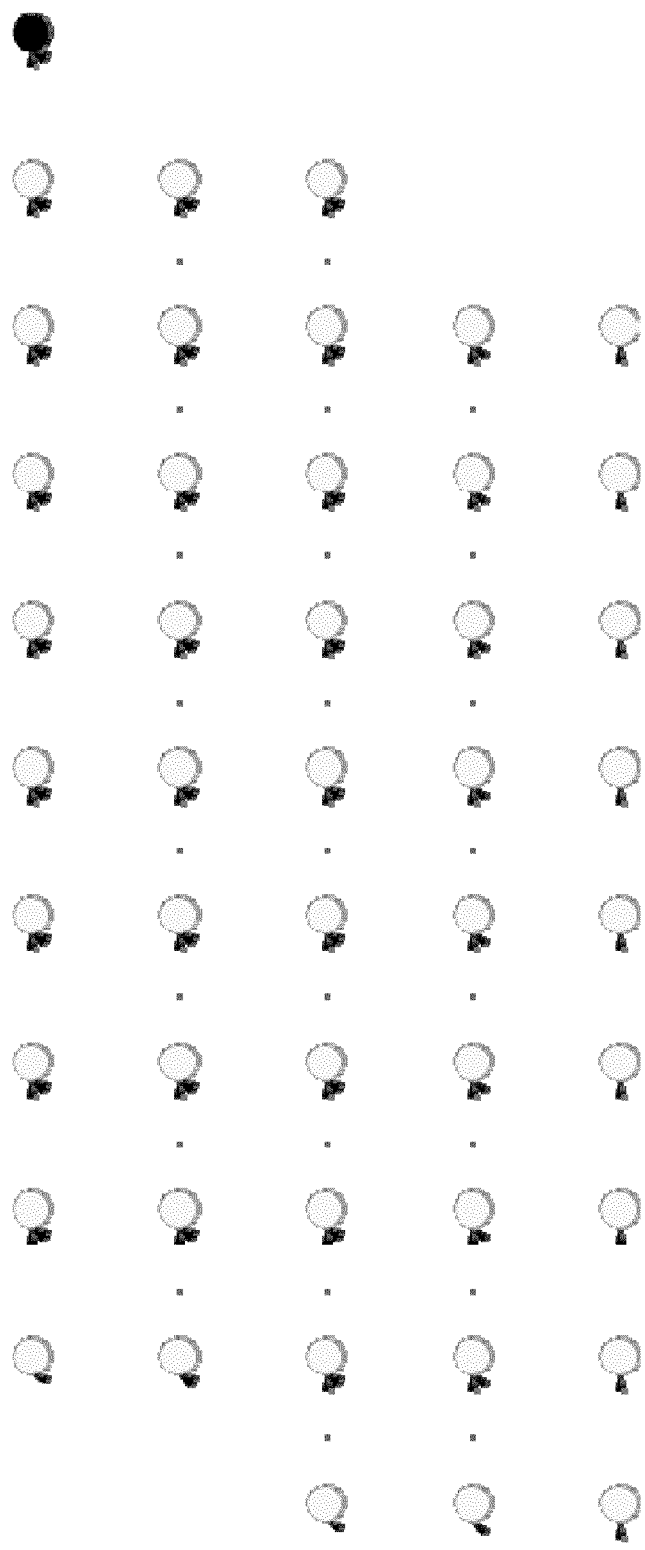
Figure 3:
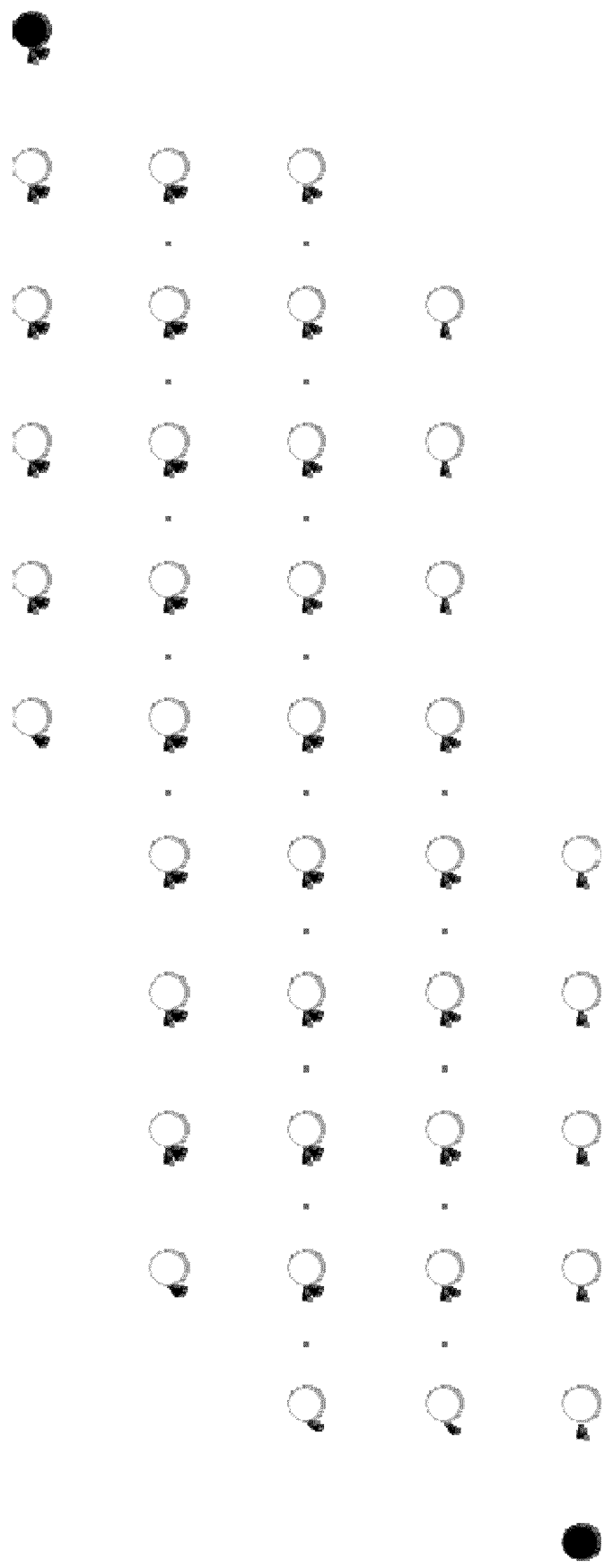

FIGS. 2-3 show how to control a trellis girth (g) and a link bandwidth (f) so that time complexity is linear in the number of pixels, and independent of the number of pixel removals per row. In practice, dynamic programming on such a trellis works out to a small number of integer operations per output pixel. Many efficiencies are possible, for example, one can compute the optimal path without ever explicitly constructing the trellis, i.e., the trellis is implicitly known.

FIG. 2 shows a trellis that restricts the number f of pixels that can be removed from each dart to two, i.e., f=2. This reduces the bandwidth of the trellis. The bandwidth is the number of links between two columns of nodes.

FIG. 3 shows a trellis is for a trellis with a maximum dart width of f=2, trimmed to girth g=4. The girth is the maximum number of nodes in any column of the trellis. Limiting girth limits the concentration of darts in the image, forcing the darts to spread out across the image. Limiting girth also controls bandwidth. If both f and g are independent of the total number of desired pixel edits, then execution time of the DP is strictly linear.

If the cost of removing a contiguous set of pixels is convex in the size of the set, then due to linearity, the global problem, i.e., a joint darting of all scanlines, is also convex, albeit in continuous coordinates. As described above, this joint darting problem can be written as an equivalent linear program (LP).

The DP trellis can be expanded to accommodate fractional pixel locations, e.g., by half-pixels, and blending of pixel values. Consider a scheme in which each scanline DP is updated whenever its shear costs change, due to updates in adjacent scanlines. This is essentially an optimal integer-valued move in a subspace of the equivalent LP polytope, the subspace spanning all the LP variables associated with the scanline. The true optimal move in any subspace may be fractional, but because the LP constraints and objective function all involve integer coefficients of bounded value, this fraction can be described with a limited amount of precision.

Thus, it follows that if the DP is expanded to small finite level of fractional precision, then such iterations converge to the global optimum, and for lower levels of fractional precision, such iterations terminate early at an approximate optimum.

Precision also determines the rate at which information about protected image structures propagates back and forth between remote scanlines and therefore the rate at which the updating reaches the optimum.

A "two-pass" solution, described below, efficiently propagates this remote information before DP, yielding a fast non-iterative non-fractional method that produces high-quality results.

With the costs are nonconvex, a texture "island", such as a freckle in an image of a face, that is narrower than a maximum single dart can inadvertently by removed. Convex costs strongly penalize such removals. Therefore it is desirable in most applications to make the costs convex.

A tightest convex non-decreasing upper bound $[c'_1, c'_2, \ldots]$ on a cost sequence $[c_1, c_2, \ldots]$ is given by $c=\max(c_i, c'_{i-1}-c'_{i-2})$. This makes the sequence of cost differences nondecreasing. For example, a sequence of shear costs 0, 1, 3, 4, 8 has differences 1, 2, 1, 4. A "convexification" 0, 1, 3, 5, 8 has differences 1, 2, 2, 3.

Manipulating Costs and Forcing Edits

By manipulating the shear costs for a single pixel, the pixel can maintain a fixed relationship to pixels above and below, or to pixels in specific columns in the output images. This can be used to preserve shapes such as faces. Similarly, the meet costs can be manipulated to make certain pixels appear or disappear. Selective pinning can be used to ensure that an image contour is folded at regular intervals, thereby preserving the shape. Alternatively, shear costs for a contour pixel can be set to encourage a placement of the pixel that is consistent with the darted slope of other parts of the contour.

More generally, to force the pinning, preservation, or removal of a series of pixels, simply omit trellis links that correspond to unwanted removals. In all cases, the affected part of the trellis does not have to be constructed explicitly because the optimal path through the trellis can be found without explicitly constructing the trellis.

One-Pass Solution.

In a very fast one-pass method, one can sequentially "fold" the scanlines from top to bottom, or from the middle scanline outwards. The shear costs of each scan line come from its just-folded adjacent scanline. Although this only propagates information outward, it works remarkably well in simple images.

Two-Pass Solution.

Considerably better results can be obtained by augmenting the local costs so that the DP optimizes an upper bound on the global cost, effectively causing the DP to consider the impact of local deletions on costs in following scanlines.

The main insight is that deleting a pixel in the current scanline forces the DP for the next scanline DP to either delete the corresponding pixel, or to shear and delete a nearby pixel.

Under the optimality principle, the DP only avoids the locally cheapest alternative if doing so enables a greater cost savings elsewhere. Therefore the cheapest alternative gives an upper bound on the impact of a single deletion on costs in the next scanline. Applying this argument recursively from the final scanline(s) back to the current scanline gives an upper bound on how much a local pixel deletion can increase the total cost for image darting.

This bound can be calculated for all pixels in an efficient min-plus accumulation. The deletion cost of a pixel in one scanline is augmented with the minimum shear-plus-augmented-deletion cost in the next scanline. This augmentation discourages DP from starting a dart inside of a foreground scene object, e.g., on the smooth cheeks of a face, because in some following scanline, the boundary of the object is sheared or folded.

Strictly speaking, nothing in the LP objective function discourages darting of a high-contrast contour in the input image that runs perfectly parallel to the scanline. For example, a large pixel-aliased circle might be darted at the top and bottom, where it is perfectly flat. To avoid such behavior, a response of an edge detector, e.g., a Canny edge detector, can be added to pixel deletion costs while back-propagating.

With convexified costs, only small shears need to be considered in the min-plus back-propagation, because fast-increasing costs quickly eliminate large shears from consideration in the min-plus DP, even if the shears have small meet costs.

Video

The one- and two-pass solutions are particularly suitable for darting images in three dimensions (X, Y, and T), i.e., a video. Each X scanline receives shear costs from the previous scanlines in time and in space, and thus scanlines in a "wedge" of scanlines in Y and T can be darted in parallel. The one-pass solution can dart streaming video; when two passes are possible, back-propagation will give better results. Min-plus back-propagation is extended to video by making the plus step take the max of the min results in successor scanlines in both Y and T.

Figure 4:
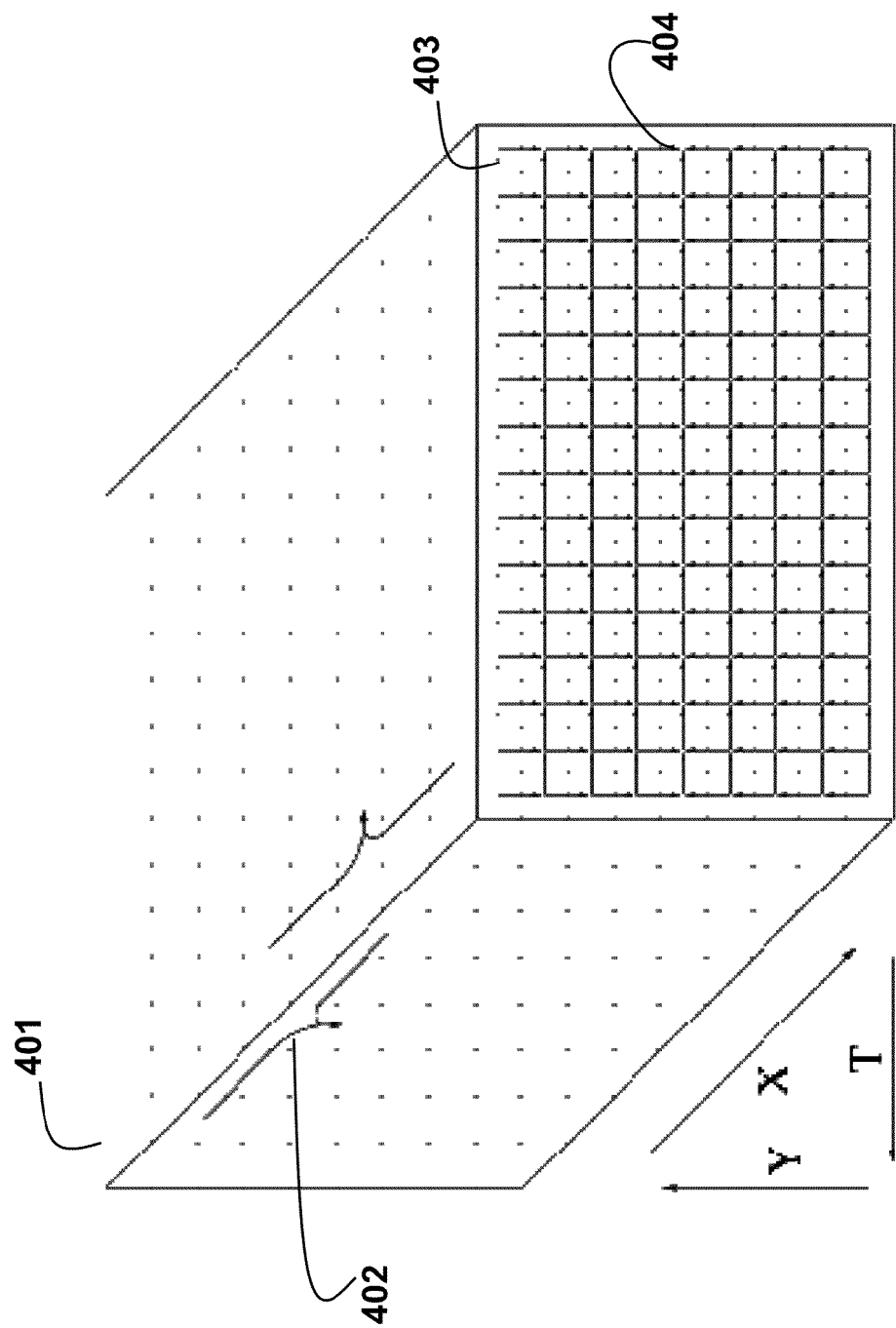
FIG. 4 is a backpropagation trellis used by the method of FIG. 1A.

FIG. 4 shows an XYT video volume 401 with min-plus cost back-propagation diagrammed for one pixel 402 on each of the XY and XT faces. This back-propagation is recursively computed over all pixels, giving the dataflow pattern 403 shown on the YT face. Converging arrows 404 on the YT face represent a max-plus operation, where each pixel receives a min shear-plus-deletion cost from a successor pixel in the Y dimension, and a successor pixel in T dimension, then adds the greater of these two costs to its deletion cost of the pixel.

In practice, the propagation of costs backward and forward in time is motion compensated. Consequently, some of the scanlines in the wedge may have to wait until their motion-compensated predecessors are processed.

Consider a video in which a foreground object enters left and exits right. Darting can retarget the raw video correctly, by removing pixels that minimize motion-compensated distortions of background and foreground texture. Prior art schemes have unavoidable distortions. Seam carving must carve the foreground object in some frames but not others, because any seam must form a connected plane in YT that crosses the volume of foreground pixels. Non-homogeneous retargeting compresses the background ahead of the object, and decompresses the background behind the object, as if the background were painted on a rubber sheet that is attached to the moving object.

Non-Rectangular Frames

The darting method can also be used without modification to retarget images or video to non-rectangular frames, e.g., oval and heart-shaped.

Stretching Frames

Figure 12:
FIGS. 12 and 13 are images before and after stretching according to embodiments of the invention.
Figure 13:

It is also possible to compute optimal stretches of the scanline, see FIGS. 12-13, with a lengthened trellis of downward links that signify duplications (or interpolations) of pixels. Downward links have costs that discourage duplication where the texture in the image is not smooth. For example, local image energy or back-propagated energy.

Figure 5:
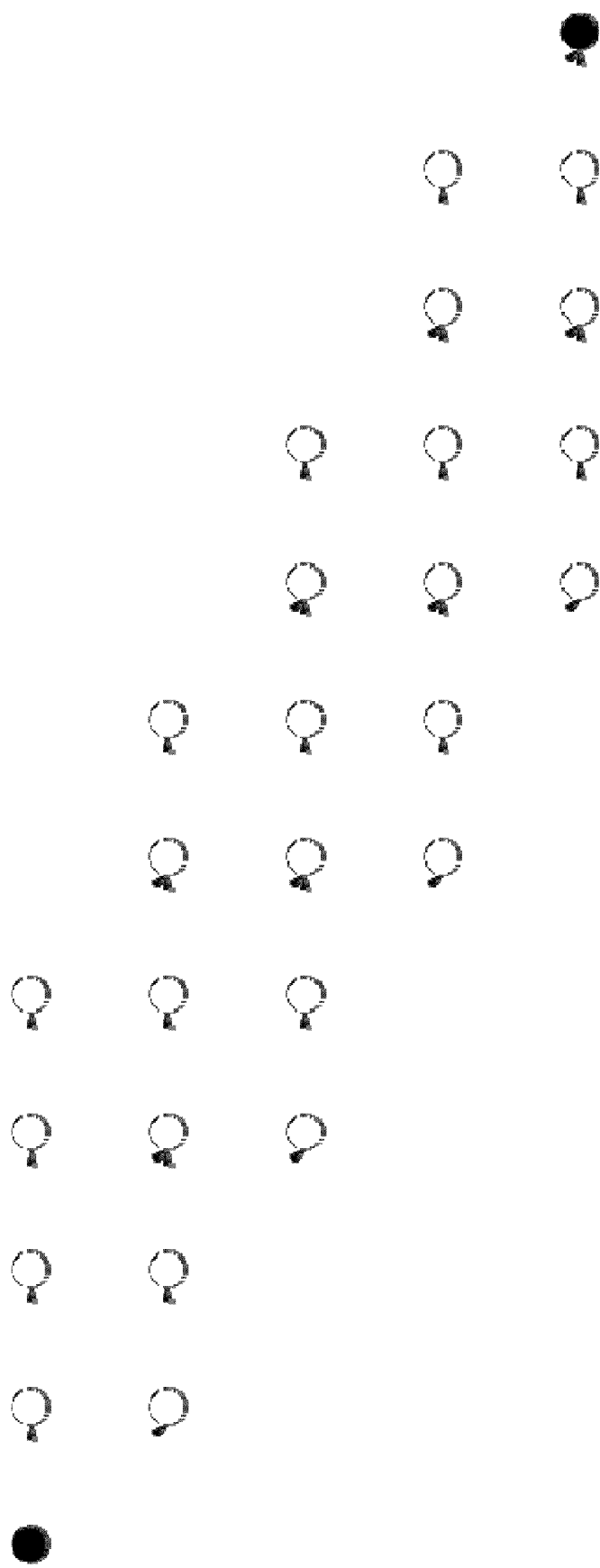
FIG. 5-6 are insertion trellises used by the method of FIG. 1A.

FIG. 5 shows an example trellis that is designed to extend an 8-pixel scanline to 12 pixels. To avoid artifacts in the form of multiple duplicates of a single pixel, this trellis only allows duplication in even columns.

Figure 6:
Figure 7:
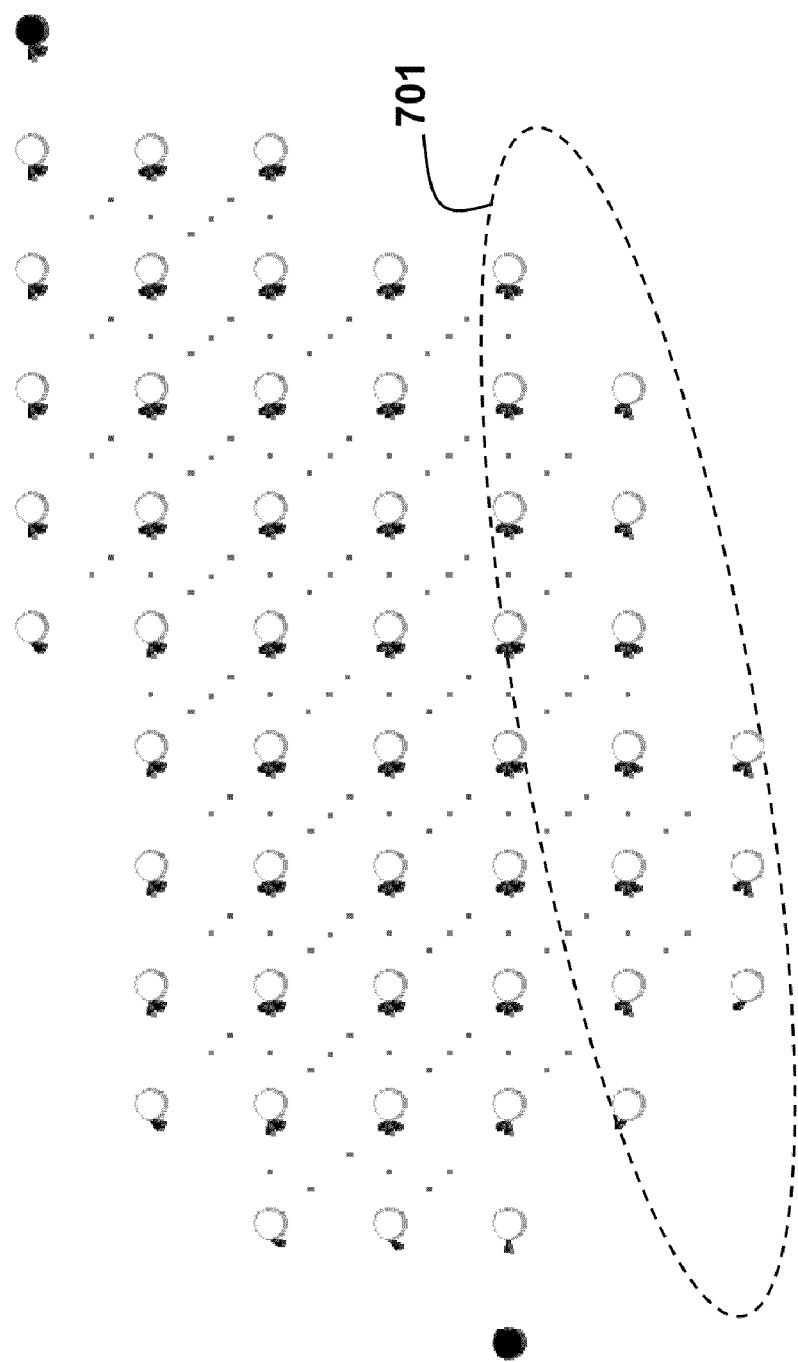
FIG. 7 is a mixed insertion-deletion trellis trellises used by the method of FIG. 1A.

FIG. 6 shows a more elaborate trellis that uses stacked replica nodes to represent the same pixel-location event in different contexts. The nodes in this trellis are connected in a manner that forces the DP to enlarge the scanline by repeating small pixel sequences. This gives a rudimentary form of texture synthesis.

Reshaping Image Contours

A trellis for shortening scanlines and a trellis for stretching scanlines can be joined by merging non-replica nodes in the latter to the corresponding nodes in the former. The resulting trellis allows both removals and insertions. One such trellis is shown in as FIG. 7. One can use this trellis to reshape contours in an image by pinning the contour pixels 701 as desired. For example, in a photo portrait, one might "thin" the subject by specifying new contours for the sides of the face and torso. The DP on the trellis then removes and fills in pixels as needed. The image dimensions need not change, and scanlines far from the pixels that are pinned remain unchanged. Pinning two contours together removes an object between them from the input image. Similarly, one can separate two adjacent columns of pixels and move them apart to insert a new object into the image. The object can be obtained from a secondary image. The secondary image can be an offset in the input image.

Tear-Outs

A single instance of the trellis of FIG. 1A can also be used to find the best ragged-edge vertical strip of pixels to "tear" out of an image. The strip can have a different and predetermined width in each row. By removing appropriate trellis links, one can guarantee that the strip contains and/or excludes various image regions.

Examples

Figure 8:
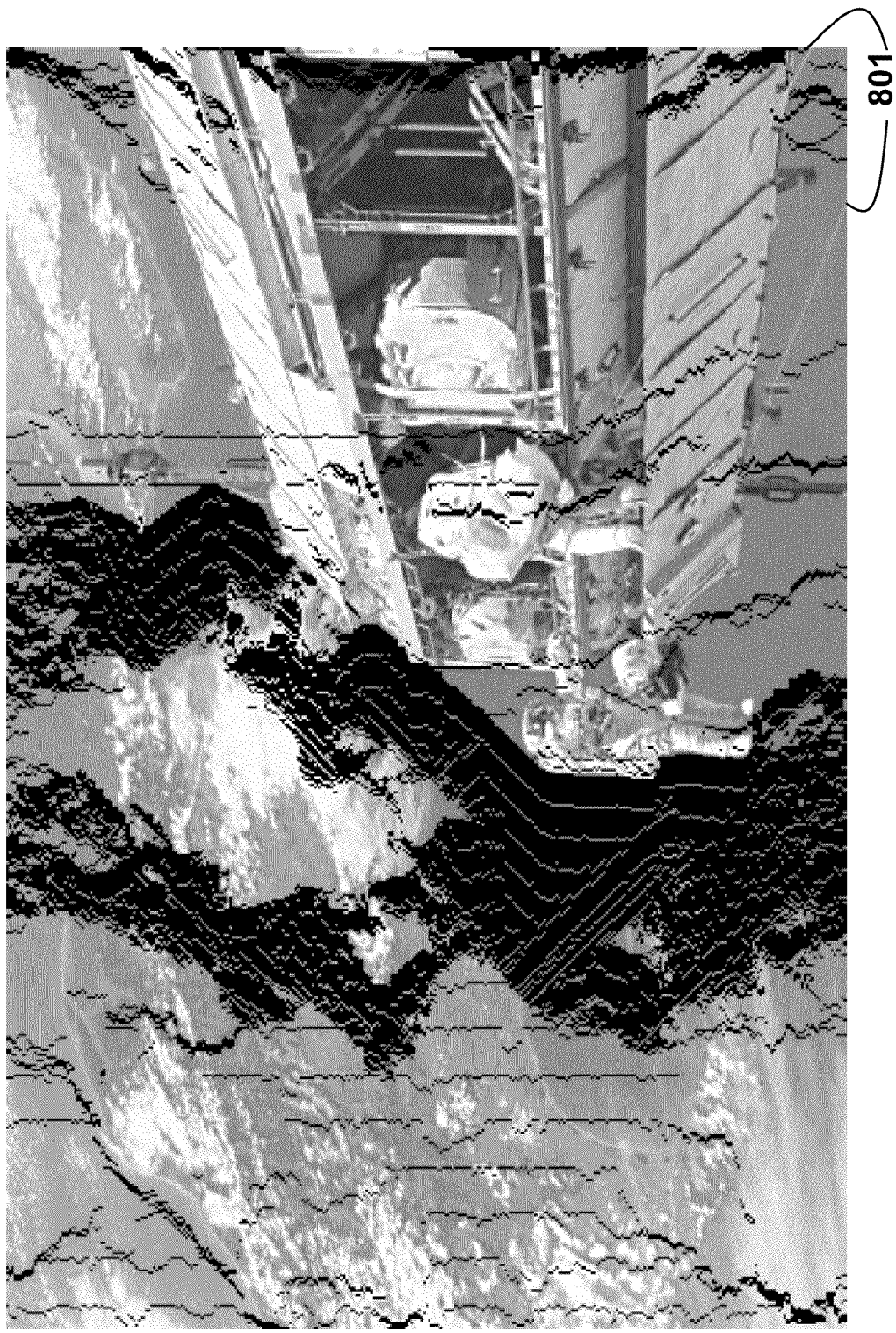
FIG. 8 is an example image with darts according to embodiments of the invention.

FIG. 8 shows the darting pattern for removing 112 of 512 columns of pixels with a trellis of bandwidth of 12 and a girth 90, as determined by the method of this invention. In this example, darts were propagated from the center scanline using information back-propagated from the top and bottom scanlines.

Figure 9:
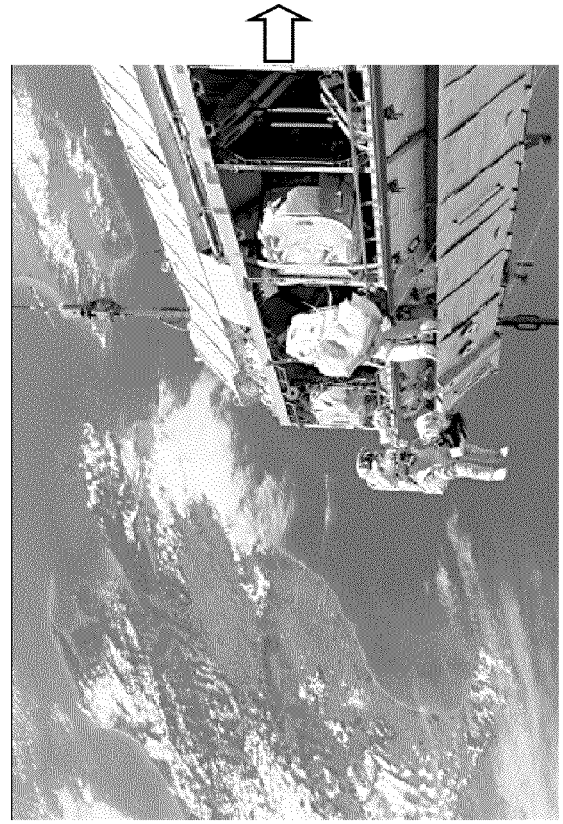
FIG. 9 is an example input image.
Figure 9:
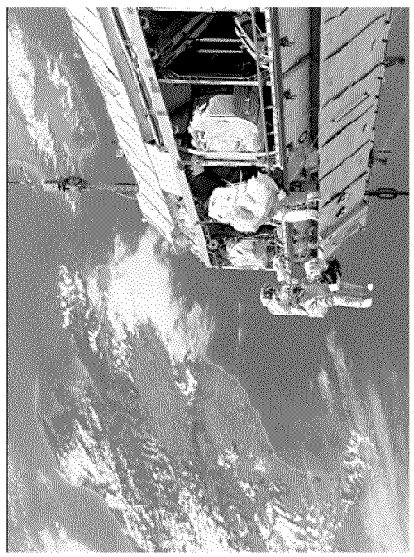

FIG. 9 shows and example input image.

Figure 10:
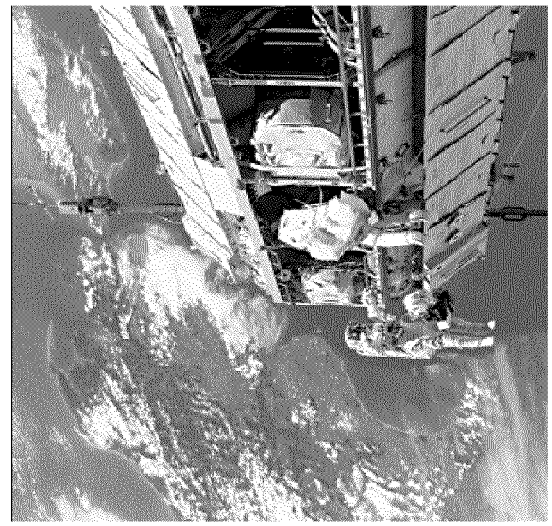
FIG. 10 is a corresponding output image according to embodiments of the invention.
Figure 8:
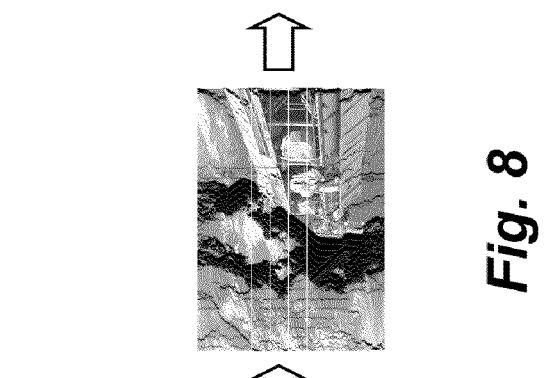

FIG. 10 shows the result after removal of the darts. Even though many disconnected groups of pixels are removed, contours are well preserved, even the pixel-wide tether lines 801.

FIG. 10 shows the result of removing 112 columns then removing 40 rows.

Figure 11:
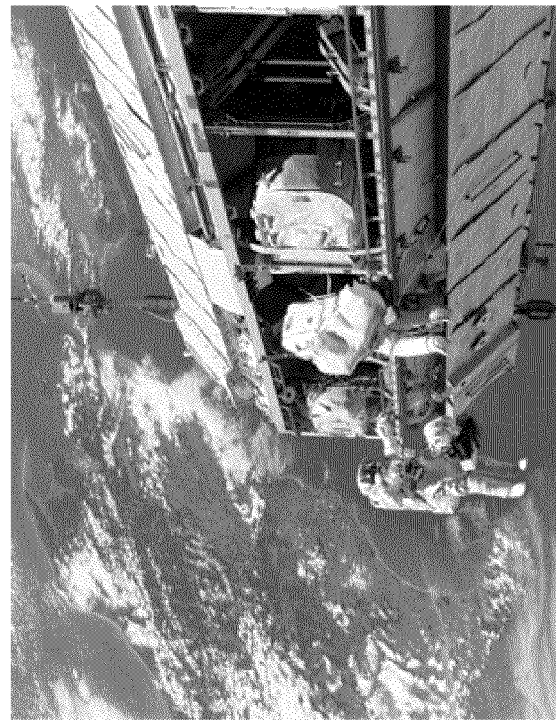
FIG. 11 is a prior art output image.
Figure 10:

FIG. 11 shows a similar result obtained using convention seam carving. Seam carving breaks coastline above the left astronaut and the tether line at bottom, clips the antenna at top, and fuses the continents near the antenna.

The darting result is free of those artifacts and generally does a better job of retaining image texture and packing it together. For example, it retains more land and cloud texture and removes more smooth ocean. Intensities are somewhat different between the two images because the seam carving code post-processes the image with pixel blends to conceal carving artifacts.

FIGS. 12 and 13 are images before and after stretching, using a trellis that inserts texture from elsewhere in the original image. Stretching the same image via seam carving or non-homogeneous retargeting would produce obvious and undesirable smooth bands of duplicated or interpolated pixels.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

I claim:

1. A method for editing an input image to produce an output image, comprising a processor for performing steps of the method, comprising the steps:
   partitioning pixels of the input image into sets of pixels, wherein the pixels in each set are adjacent, and for each set of pixels, further comprising the steps of:
   defining a trellis having nodes connected by directed links, wherein each node corresponds to one of the pixels in the set of pixels, and each node is associated with an action and location of the pixel in the output image;
   assigning costs to the nodes and the links;
   determining a path through the trellis, wherein the path has a least cost; and
   applying, for each node on the path, the action associated the node to the corresponding pixel in the input image to edit the corresponding pixel at the location in the output image associated with the node.

2. The method of claim 1, wherein the determining applies dynamic programming to the trellises.

3. The method of claim 1, wherein the assigning further comprises:
   assigning a shear cost to each node; and
   assigning a meet cost to each link.

4. The method of claim 3, wherein the shear cost represents artifacts and distortions due to moving a pixel into a new position relative to pixels in other sets of pixels, and the meet cost represents artifacts and distortions due to moving pixels within the current set together.

5. The method of claim 3, further comprising:
   making the shear costs and the meet costs convex.

6. The method of claim 1, wherein the trellis has a start node and a terminal node at opposite corners of the trellis, and the least cost path runs from the start node to the terminal node.

7. The method of claim 1, wherein the assigning further comprises:
   assigning a color-change cost to each link connected to the start node and each link connected to the end node.

8. The method of claim 1, wherein the nodes of the trellis are organized into rows and columns and a node in column i, row j represents an event that the pixel from column i+1−1 in the input image is copied to column i in the output image.

9. The method of claim 8, wherein the path represents a consistent set of events, and a cost of the path is a sum of the costs of the events.

10. The method of claim 8, wherein for shrinking the image, node i,j is linked to all nodes i+1, k with k>j, and if k>j, the path through the link incurs the meet cost of bringing pixel i+j−1 into adjacency with pixel i+k by removing k−j pixels.

11. The method of claim 8, wherein the trellis has a start node and a terminal node at opposite corners of the trellis, and the least cost path runs from the start node to the terminal node, and wherein all nodes in a first column are connected to the start node, and all nodes in a last column are connected to a terminal node.

12. The method of claim 8, wherein the trellis has a bandwidth and a girth, wherein the bandwidth is a number of links directly connecting any two columns of nodes, and the girth is a maximum number of nodes in each column; and a subset of nodes and arcs are omitted from the trellis to satisfy limits on the bandwidth and the girth.

13. The method of claim 3, wherein a cost of removing a subset of the pixels is convex in a size of the subset.

14. The method of claim 1, wherein the action is at fractional pixel locations and blends pixel values.

15. The method of claim 1, wherein the pixel sets are arranged in horizontal scanlines or vertical scanlines of the input image.

16. The method of claim 1, wherein the steps are applied to a video including a temporal sequence of the input images to produce a sequence of output images, and the costs penalize artifacts and distortions in space and time.

17. The method of claim 1, wherein a size and shape of the output image is arbitrary.

18. The method of claim 3, further comprising:
    determining the shear costs of nodes from the locations and values of a previously processed set of pixels.

19. The method of claim 3, further comprising:
    determining an additional meet cost for each link according to an impact that the path through the link has on the shear costs of subsequently processed sets of pixels.

20. The method of claim 1, further comprising:
    defining additional nodes and links representing duplication and insertion of additional pixels from a secondary input image.

21. The method of claim 20 wherein the secondary image is offset to the input image.

22. The method of claim 1, further comprising:
    removing selected nodes and links from the trellis to force the path through other nodes to preserve a corresponding portion of the input image in the output image.

23. The method of claim 1, wherein the action is selected from a group consisting moving, deleting, inserting, and modifying the pixel.

24. The method of claim 1, wherein the trellis is implicitly known.

* * * * *